May 23, 1967 L. R. ALLENDORPH 3,321,654
DYNAMOELECTRIC MACHINE FRAME
Filed April 1, 1964
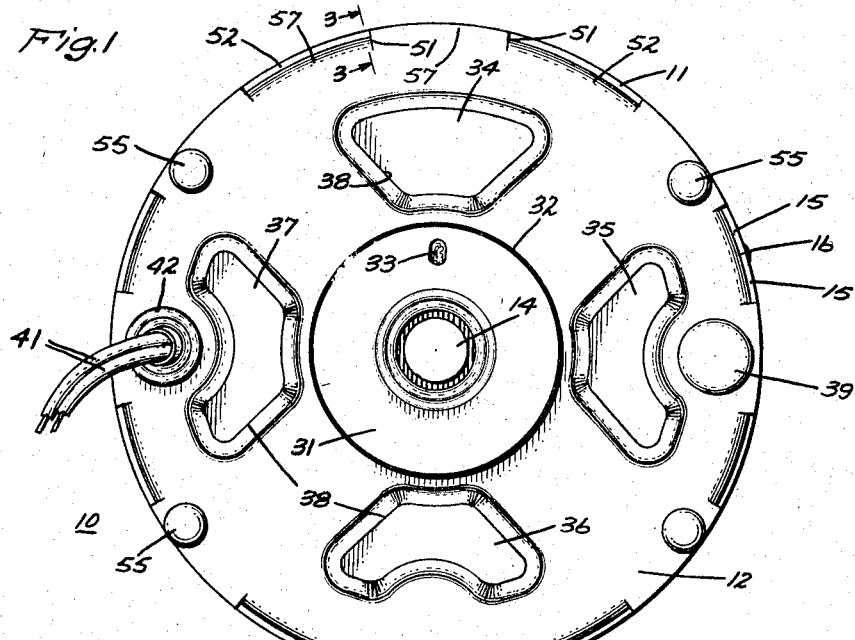
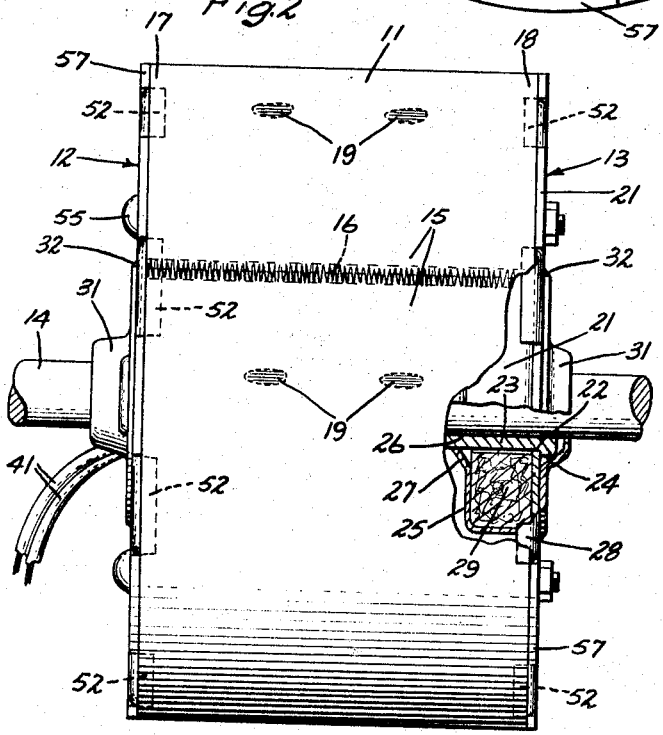
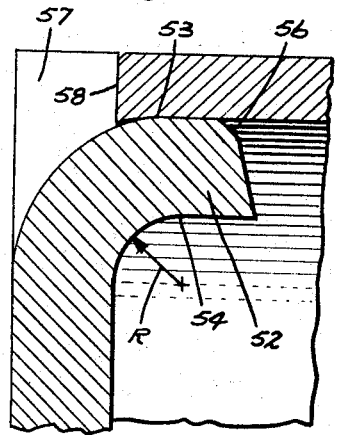
INVENTOR.
Lewis R. Allendorph,
BY John M. Stoudt
Attorney.

United States Patent Office 3,321,654
Patented May 23, 1967

3,321,654
DYNAMOELECTRIC MACHINE FRAME
Lewis R. Allendorph, Fort Wayne, Ind., assignor to General Electric Company, a corporation of New York
Filed Apr. 1, 1964, Ser. No. 356,564
4 Claims. (Cl. 310—258)

The present invention relates to dynamoelectric machine frames and more particularly to frames having an improved connection between a tubular shell formed of sheet material and an end frame arranged at one end thereof for supporting one side of the rotating part of the machine.

In the construction of certain dynamoelectric machines, it has become customary, primarily for reasons of economy and strength, to build the machine housing or frame with a central tubular shaped shell. This shell is usually fabricated from an elongated rectangular flat sheet stamped from suitable material such as steel, the sheet normally being rolled into a somewhat cylindrical form, such as that revealed in Patent 2,778,965—Feiertag et al. assigned to the same assignee as the present invention. The mating ends of the rolled sheet, which either overlap or abut, are joined together by a weld running for the longitudinal length of the connection to provide a closed seam at that location. The stator core of the machine, such as that disclosed in U.S. Patents 2,151,561 and 2,267,414 both issued to W. J. Morrill, is mounted within the shell and attached thereto by a pressure fit, spot welding, or the like.

At each end of the shell an end shield or end frame is connected in abutting relation therewith to complete the machine frame. A number of through-bolts are used to secure the frame components firmly together. The end shields in turn each mount bearings which serve to support a rotor and its shaft for relative rotation with respect to the stator core and frame. In order to achieve further economies in the frame structure for this type of motor, especially for certain domestic applications using small and fractional horsepower motors; e.g. oil burner applications where the motor drives a blower, the walls of the end frames mounting the bearings are fabricated from sheet material like steel. To prevent sparks which might occur during motor operation from escaping from the motor interior into a potentially dangerous surrounding combustible environment, these walls are made imperforate.

Unfortunately, the above frame construction, although basically desirable from the standpoint of economy, includes certain drawbacks. In the past, considerable difficulty has been experienced during the mass production manufacture of these motors in achieving, with the desired consistency, accurately aligned bearing and shaft components as well as concentricity between the rotor and stator to provide a generally uniform air gap. More specifically, during the assembly of these motors, it is essential that in order to produce the foregoing relationships, the connection between the end frames and associated end of the shell be provided such that the bearing journals carried by the end frames have a co-axial relationship relative to one another and have a predetermined concentric relationship with respect to the axis of the motor and to the respective ends of the shell.

However, regardless of any accuracy which might have been obtained in the formation of a true circle of the internal shell surfaces during the rolling operation, when the seam is welded to produce the shell and the stator core is attached to the shell, considerable distortion or deflection occurs at the respective ends of the shell to form an irregular circumference of the internal surface. This distortion adversely affected the accuracy of the connection made between the end frame and shell, which in turn, tended to cause the bearings to be off-center from the true axis of the motor thus producing misalignment of the rotatable and stationary parts and creating interference with the freedom of shaft rotation. In addition, in some cases, the misalignment was so great as to create the well-known frozen shaft condition and contact between the rotor and stator core even though the motor was designed to have an air gap of 12 mils.

In an effort to correct this situation, the internal surface at each end of the shell as well as the mating part of the end frame was machined in an attempt to obtain close tolerances between the parts. However, in spite of these attempts, the diameter across the shell in certain cases varied as much as 20 mils between the maximum and minimum dimensions and the misalignment condition was not solved. Moreover, with the end frames being fabricated from sheet material, a totally enclosed connection with the shell was extremely difficult, if not impossible to achieve.

Accordingly, it is the general object of my invention to provide an improved dynamoelectric machine frame construction, and it is a more specific object to provide an improved machine frame which overcomes the problems and deficiencies mentioned above.

Another object of the present invention is the provision of an improved dynamoelectric machine frame construction which is easily assembled and insures excellent co-axial alignment of internal bearing surfaces with one another and a true concentric relation of these surfaces with respect to the axis of shaft rotation with a high degree of consistency from one machine to another at a relatively low unit cost.

It is still another object of my invention to provide an improved frame construction having a central shell fabricated from sheet material and at least one end frame mating with the shell at one of its ends, in which any deflection from a true circle occuring at the internal surface of the shell ends is corrected by the end frame to produce a totally enclosed connection.

In carrying out the objects of the invention in one form, I provide a dynamoelectric machine with an improved stationary frame formed of sheet material which rotatably supports the rotor shaft. The frame includes a tubular shell surrounding the machine components which is closed at each end by an end frame having a member mounting a bearing centrally thereof for journalling an end of the shaft. The sheet member of the end frame is cut at a plurality of angularly spaced apart locations at its periphery and bent axially between alternating cuts to form a number of relative short, angularly spaced apart sections. These sections are constructed with a transversely curved outer surface defining an arc of the same circle having a common center at the axis of rotation of the machine and furnishes an interference fit with the inner surface of the shell. This construction tends to force the shell end into a circular form also having a center at the rotational axis of the machine. To insure proper deflection of the shell edge at the connection between adjacent sections, the member has a greater thickness than the shell which is thereby flexible with respect to the member, with at least two pairs of sections being in diametrically opposed relation.

Alternating with these sections are a number of upright sections each having a radial face in abutting relation to the extreme edge of the shell. The two types of sections together form a totally enclosed connection between the shell and the end frame. In addition, due to the construction of this connection and the corrective deflection imparted to the shell ends, the rotational axis of the machine in effect serves as a common center of generation for the journals of the shaft, the axially bent outer surfaces of the end frame members, and the inner surface of the shell ends. This, in turn, produces coaxially aligned machine components, such as the bearings and shaft as well as concentricity between the rotor and stator core. All of the foregoing is achieved in spite of the fact that the frame is formed of sheet metal material and is relatively inexpensive to fabricate.

The subject matter which I regard as my invention is particularly pointed out and distinctly claimed in the concluding portion of this specification. My invention, itself, however, both as to organization and method of operation, together with further objects and advantages thereof may best be understood by reference to the following description taken in connection with the accompanying drawing.

In the drawing:

FIG. 1 is an end view of a dynamoelectric machine having a frame formed of sheet material incorporating the preferred form of the present invention;

FIG. 2 is a side elevational view of the machine of FIG. 1, partially broken away to show details; and FIG. 3 is an enlarged cross-sectional view taken along line 3—3 in FIG. 1.

Referring now to the drawing in more detail, number 10 generally indicates a dynamoelectric machine, such as a small electric motor, having a housing or frame 11 incorporating the preferred form of the present invention. In the illustrated embodiment, the machine frame is formed by a central generally imperforate shell 11 whose ends are closed by a pair of end frames 12 and 13 respectively which serve to support rotor shaft 14. With reference to the shell it is punched out of a relatively thin elongated rectangular sheet of suitable material such as steel rolled into a generally tubular form having an axial length of predetermined size with edges 15 secured together in abutting relation by a welded seam 16 extending the axial length of the shell. Intermediate its ends 17 and 18 the shell supports a conventional stator core (not shown) such as that illustrated in aforementioned Morrill patents. By way of example, the stator core is attached to the shell at four equally and angularly spaced apart locations as by a pressure fit or spot welds indicated at 19, between the engaging surfaces of the core periphery and the shell.

Referring now to a description of end frames 12 and 13 revealed in the drawing, it will be seen that as illustrated they are of similar construction. In particular, each end frame is built with a rigid bearing support member 21 stamped or punched out of suitable sheet material, such as steel, into a generally disk-shaped configuration having an uninterrupted, substantially circular, outer periphery which dimensionally approximates the contour of the outermost circumferential surface of shell 11. Centrally of member 21 is provided an opening 22 through which projects one end of a sleeve type sintered bearing 23 for journalling one side of rotor shaft 14. The bearing may be supported by member 21 in any suitable way, for example, by staking the outboard end 24 of the bearing to the support member.

A generally cup-shaped sheet metal element 25 surrounds the outer surface of the bearing intermediate its ends with spaced relation therewith and supports the inboard end 26 of the bearing by engagement with its central flange 27. The outer edge of the element is bonded to the inner surface of member 21 by adhesive material; e.g., epoxy resin or the like 28, along the entire perimeter thereof, and along with the outer longitudinal wall of the bearing and the inner surface of member 21, forms a lubricant reservoir. The reservoir may be filled with suitable lubricant-retaining material, such as an oil impregnated felt pad 29. Lubricant is supplied from the reservoir to the journal surface of the bearing through the bearing body at a predetermined rate in a manner well understood in the art.

Surrounding the outboard end of the bearing in sealing relation with shaft 14 is a flanged plate 31, attached to the outer surface of sheet member 21 by suitable adhesive material, such as epoxy resin 32. In addition, for admitting lubricant to the reservoir from time to time, from a point externally of the motor aligned holes 33 are furnished through flanged plate 31 and member 21 in communication with felt pad 29.

Intermediate plate 31 and the periphery of sheet member 21 are provided several spaced apart weakened regions 34, 35, 36, 37 (FIG. 1) defined by perimetrical indentations 38 stamped into member 21 during its formation from the sheet of material. These regions are each adapted to be removed by a hammer blow or the like in the event that ventilation apertures are desired in those locations when the end frame is to be used for applications not requiring a totally enclosed frame. A pair of weakened circular regions 39 may also be provided in diametrically opposed relation respectively over regions 35 and 37. Only one has been shown in place in FIG. 1 since the other has already been removed to permit entrance of power leads 41 to the interior of the motor. A standard grommet 42 fitted into the opening formed after one of regions 39 was removed, furnishes a seal between the leads and member 21. This opening, when formed during the stamping operation, may conveniently serve as a guide for advancing the piece progressively through the stamping operation in the well-known way. Unremoved region 39 seen in FIG. 1 may be taken out and replaced by a common winding thermal protector switch or the like (not shown) if desired.

Turning now to an important aspect of the present invention, the connection between sheet member 21 and the associated end of shell 11 serves to correct deflections from a true circle which might occur to the internal surface at the ends of the shell 11. At the same time, in the preferred form the connection also furnishes a totally enclosed structure even though member 21 and shell 11 are both formed from sheet material. The foregoing is achieved in the preferred embodiment by cutting the peripheral edge of sheet member 21 at a plurality of angularly spaced apart locations, designated by numeral 51, during the punching operation and bending alternate portions between cuts axially away toward the interior surface of the end frame member to form a number of angularly spaced apart, structural strong and rigid support sections 52. Each section 52 is arcuate-shaped in a transverse direction as best seen in FIG. 1, with the outer surface 53 (FIG. 3) thereof serving as a seat for the inner surface of shell 11. The curvature of surfaces 53 are all part of the same circle having substantially a common center of revolution at the rotational axis of the machine, the surfaces further being substantially parallel to that axis. In other words, in the illustrated embodiment each spaced apart curved section 52 is provided such that the transverse curvature of its outer surface 53 is substantially concentric to the journal surface of the bearing or to the journal of the shaft supported to form an interrupted, arcuate-shaped, generally stiff surface which tends to force the inherently weaker and thereby more flexible shell end to deflect between adjacent surfaces 53 such that the end attempts to assume a circular form (in effect) having a center of revolution at the rotational axis of the machine.

For best deflection results of the shell, it is desirable that the interrupted circle defined by surfaces 53 have a diameter slightly greater than the nominal diameter of the theoretical circle for the internal surface of shell 11 at its ends with which sections 52 cooperate. For example, assuming a shell is initially formed with a nominal, theoretical, diameter of 4.787 inches, surfaces 53 could be bent axially to define a circle having a nominal diameter of 4.804 (+.002) and if desired, subsequently machined to provide an accurate diameter of 3.792 forming arcuate surfaces all having a true, common center which coincides with the axis of rotation of the machine formed by the bearing journals. The interference fit of the connection, along with the curvature and inherent strength of sections 52, all contribute toward deflecting the weaker shell end between adjacent sections 52 in the manner of a chord. To insure this end, the sum of the angular transverse lengths for all sections 52 should be between 35 and 65% of the total circumference of the circle of which there be a part. In addition, at least two pairs of sections 52 should be arranged in diametric relation to augment this action. Further, by having the angular sum in that range and choosing the proper individual angular length and total number of sections 52 for a given size of motor (eight being shown), the unit force on any one section can be effectively controlled and minimized. A number of through-bolts 55 having a center near the circle on which the bends of sections 52 lie, intermediate adjacent sections 52, may be employed to hold the shell and end frames firmly together with a predetermined force.

In order to obtain the maximum benefit of the present invention and to insure that the proper deflection is in fact imparted by sections 52 to the respective ends of shell 11, the cross-sectional thickness of sheet member 21 should be greater than that of the shell; e.g., .075 inch for the end frame of the above example vs. .050 inch for the shell. Moreover, as seen in FIG. 3, the radius of the bend at the inner surface 54 for section 52 should be less than the thickness of sheet member 21; e.g., .055 inch, and the axial length of surface 53 should be kept as short as possible for reasons of rigidity. These relations, along with the transverse curvature of each section, augment the stiffness of sections 52 and restrict the tendency of them to pivot in radial and axial directions away from a true circle when the end frames and shell are being assembled together. To facilitate the assembly, the upper edge on the free end of section 52 is furnished with a taper 56.

From an inspection of the drawing, it will be observed that the unbent portion of the periphery or sheet member 21, intermediate bend sections 52, provides upright sections 57 defining a radial planar surface 58 generally perpendicular to the axis of the machine and adapted to abut axially against the extreme end of shell 11, best illustrated in FIGS. 2 and 3. Sections 57 function to assist in providing co-axial alignment between the bearing journals and the axis of rotation, with the space directly over sections 52 compensating for slight distortion occurring at the ends of the shell from the stamping operation (see FIG. 3). In addition, sections 52 and 57 together form, in effect, a totally enclosed connection between the respective ends of the shell and the associated end frame in spite of the fact that the entire motor frame is fabricated from sheet material and the parts are disposed in abutting relation at their peripheries.

Thus, by the present invention, it is possible to utilize sheet material for the motor frame even though the shell component thereof may be distorted from a true circle by the stator core, and still achieve satisfactory co-axial and concentric alignment between stationary and rotational motor components. Further, such alignment is possible with a high degree of consistency from one machine to another at a relatively low unit cost while a totally enclosed connection between the frame compounds may be obtained.

While in accordance with the patent statutes, I have described what at present is considered to be the preferred embodiment of my invention, it will be obvious to those skilled in the art that numerous changes and modifications may be made therein without departing from the invention and it is therefore aimed in the appended claims to cover all such equivalent variations as fall within the true spirit and scope of the invention.

What I claim as new and desire to secure by Letters Patent of the United States is:

1. In a dynamoelectric machine having a stationary frame formed of flexible sheet material rotatably supporting a shaft; a substantially tubular shell and an end frame having a member fabricated of rigid sheet material mounting a bearing and being connected to one end of said shell; said member including a plurality of angularly spaced apart first sections bent axially toward the shell; said sections each including a transversely curved outer surface with the transverse curvature thereof defining an arc substantially of the same circle having a common center at the rotational axis of the machine; said outer surfaces providing a tight fit with first portions of the inner surface of the associated shell end, said first portions conforming to said outer surfaces and second portions of said associated shell end between said spaced apart first sections tending to form chords of the circle defined by said outer surfaces as said shell end is forced into a generally circular form by said first sections, the generally circular form having a common center at the rotational axis of the dynamoelectric machine; and said member having second sections alternating with said first sections in abutting relation with the edge of said associated shell end.

2. In a dynamoelectric machine having a stationary frame formed of flexible sheet material rotatably supporting a shaft; a substantially tubular shell and an end frame having a member fabricated of rigid sheet material mounting a bearing and being connected to one end of said shell; said member having a greater thickness than said shell and including a plurality of angularly spaced apart first and second sections in alternating relation with said first sections being bent axially toward the shell, said first sections each having a relatively short axial length and radius of bend adjacent the second sections, said first sections further including a transversely curved outer surface with the transverse curvature thereof defining an arc substantially of the same circle having a center of revolution at the rotational axis of the machine, the associated shell end being generally non-circular prior to assembly with said end frame, said outer surfaces firmly engaging first portions of the inner surface of the associated shell end thereby tending to force said shell end first portions into generally arcuate forms having a common center at the rotational axis of the dynamoelectric machine, and second portions of the associated shell end lying between said first sections taking the form of chords of the circle defined by said outer surfaces when said first sections force the first portions of said shell end into arcuate forms wherein the associated shell end is generally circular after assembly with said end frame, said member having second sections alternating with said first sections in abutting relation with the edge of said associated shell end; said first and second sections together defining a totally enclosed connection with the end of said shell and providing co-axial alignment of the bearing and associated shell end of the machine.

3. In a dynamoelectric machine having a stationary frame supporting a shaft; a substantially tubular shell formed of sheet material and an end frame having a member fabricated of rigid sheet material mounting a bearing centrally thereof and being connected to one end of said shell; said member being cut at a plurality of angularly spaced apart locations at its periphery with alternate peripheral portions between the cuts thereof being bent axially to form a number of relative short, axially extending, stiff first sections having inner surfaces; said member further having a greater cross sectional thickness than that of the shell and the radius of bend for the inner surface of said first sections being dimensionally less than the thickness of said member to augment the stiffness of said first sections relative to said shell said first sections including a transversely curved outer surface, with the transverse curvature thereof defining an arc of substantially the same circle having a common center at the rotational axis of the machine; the outer surfaces of said first sections providing a tight fit with the inner surface of the associated shell thereby tending to force said shell end into a circular form having a center at the same rotational axis, said first sections further including at least two pairs in diametrically opposed relation, said member having second upright sections at its periphery alternating with said first sections in abutting relation with the edge of said shell, with said first and second upright sections together defining a totally enclosed connection with the end of said shell.

4. In a dynamoelectric machine having a totally enclosed stationary frame supporting a shaft; a substantially tubular shell formed of sheet material and an end frame having a member fabricated of rigid sheet material mounting a bearing centrally thereof and being connected to one end of said shell; said member being cut at a plurality of angularly spaced apart locations at its periphery, with alternate peripheral portions between the cuts thereof being bent axially to form a number of relatively short axially extending stiff first sections having inner surfaces; said member further having a greater cross-sectional thickness than that of said shell and the radius of bend for the inner surfaces of said first sections being dimensionally less than the thickness of said member to augment the stiffness of said first sections; said first sections each including a transversely curved outer surface with the curvature thereof defining an arc of substantially the same circle having a common center at the rotational axis of the machine; said outer surfaces of said first sections providing an interference fit with the inner surface of the associated shell end thereby tending to force said shell end into a circular form having a center at the rotational axis of the machine; said member having second upright sections at its periphery alternating with said first sections in abutting relation with the edge of said shell; said first sections further including at least two pairs of diametrically opposed relation, with the sum of the curvature for all of said sections being between 35–65% of the total circumferential length of their circle to insure proper circular deflection of the edge of the shell between adjacent first sections; and said first and second upright sections together defining a totally enclosed connection with the associated end of said shell.

References Cited by the Examiner

UNITED STATES PATENTS 1,557,000  10/1925  Kuhls _____ 30—258

MILTON O. HIRSHFIELD, *Primary Examiner.*

J. W. GIBBS, *Assistant Examiner.*